April 5, 1938. E. H. NIEMAN 2,113,550
MEANS FOR CALIBRATING SPRINGS
Filed July 29, 1936
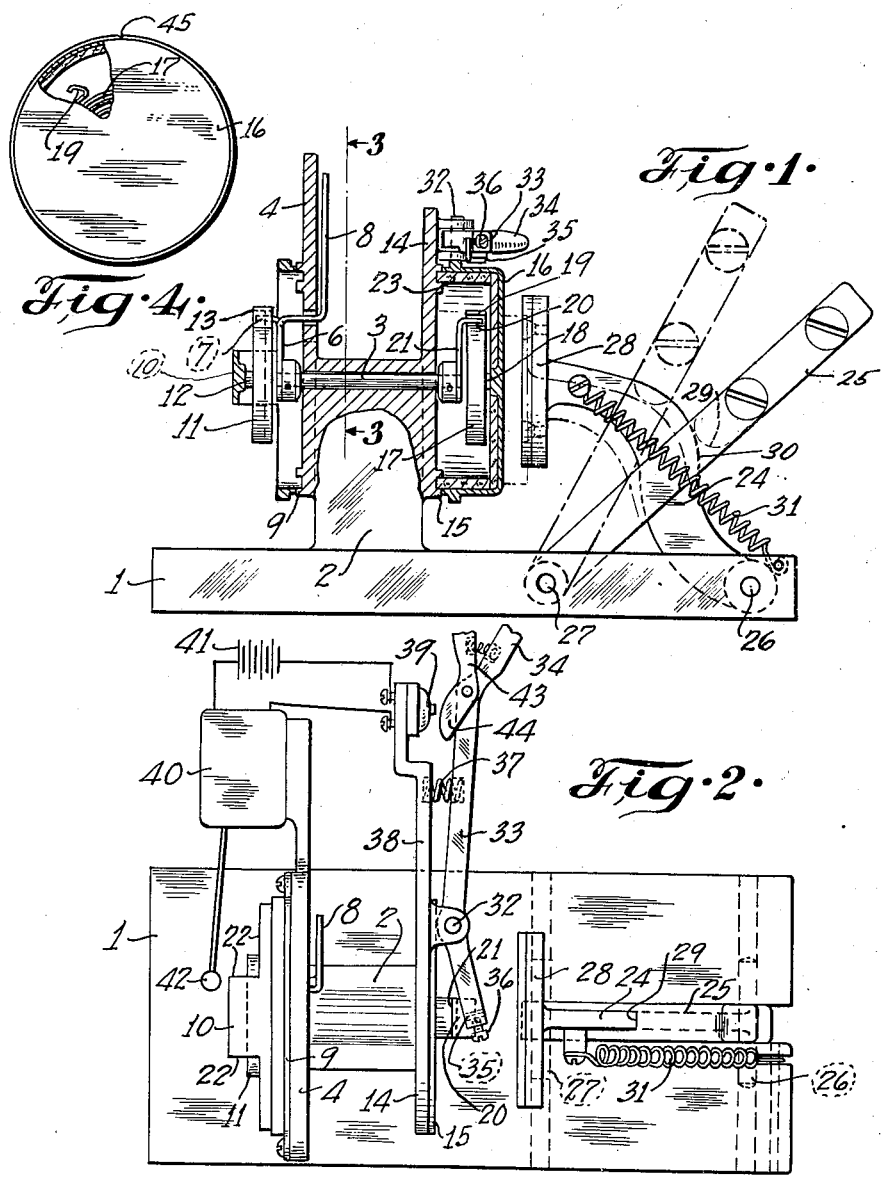
Inventor
Ernst H. Nieman
By Donald U. Rich
Attorney Patented Apr. 5, 1938

2,113,550

UNITED STATES PATENT OFFICE 2,113,550

MEANS FOR CALIBRATING SPRINGS

Ernst H. Nieman, Pasadena Hills, Mo., assignor to Carter Carburetor Corporation, St. Louis, Mo., a corporation of Delaware Application July 29, 1936, Serial No. 93,203

6 Claims. (Cl. 73—51)

This invention relates to devices for calibrating springs and, more particularly, for facilitating the assembly of thermostatic carburetor choke control springs with their supporting structure.

Modern automatic choke carburetors are generally equipped with thermostatic springs in the form of bimetallic, coiled spirals. Due to manufacturing difficulties, these springs can not be made absolutely uniform, in quantities, and, in order to insure the application of the proper force to the choke, particularly in cold starting, each coil must be accurately calibrated in accordance with the particular installation.

One object of the present invention is to provide simple and efficient means for determining the force applying characteristics of thermostat springs.

Another object is to provide means for marking the thermostat mounting so as to facilitate proper assembly of the same with the carburetor or other support.

Still another object is to provide novel means for attaching the unknown thermostat to the calibrating fixture.

These objects and others hereafter appearing are attained substantially by the present invention which facilitates balancing the unknown thermostat against a master coil of known properties and scribing or otherwise marking the mounting of the unknown coil to indicate the extent of distortion thereof which will apply a desired force to the choke valve.

In the accompanying drawing,

Figure 1 is a side view of a fixture embodying the invention, portions being sectioned for clearer illustration.

Figure 2 is a top view of the fixture.

Figure 3 is a sectional view taken substantially on the line 3—3 of Figure 1, and Figure 4 is an elevation showing a choke control thermostat and housing, a portion of the housing being broken away.

The fixture comprises a base plate 1, which may be bolted or otherwise secured in a convenient position for the operator, the plate having an upright support 2 forming a bearing for a rotatable shaft 3. At the left side of support 2, Figure 1, is a plate 4 having a series of index markings as at 5. Rigid with shaft 3 adjacent plate 4 is a crank or arm 6 having a horizontal lip 7 and an indicating finger 8, the latter being in juxtaposition with index markings 5. Plate 4 also includes ribbed structure 9 for receiving the casing or mounting portion 10 of a master coil 11 having known properties. Coil 11 is of flat, spiral shape and is secured at its inner end to a pintle 12 at the center of mounting 10 and at its outer end is a hook 13 engaging lip 7 for yieldingly resisting rotation of shaft 3 in one direction, in the present instance, in a counterclockwise direction when viewed from the right of Figure 1 and relative to section 3—3.

At the right side of support 2 is a second plate 14 having ribbed structure 15 for receiving the edge of housing part 16 which mounts the unknown thermostat coil 17. Coil 17 is secured at the center to pintle 18 projecting inwardly from casing 16, and at its outer end has a hook 19 engaging lateral lip 20 on arm 21 rigid with the right end of shaft 3. The master coil and its mounting, and the thermostat part to be calibrated, in the present instance, are identical except that housing 10 of the master coil is cut away as at 22, and casing 16 is provided with the usual cork lining 23 for insulating purposes.

The unknown coil and housing may be secured to plate 14 by novel means including levers 24 and 25 pivoted to spaced portions of the base plate as at 26 and 27. Lever 24 has an abutment plate 28 at its upper end for resting against housing 16, as shown in broken lines. Lever 25 is preferably longitudinally slotted for straddling lever 24 and has a curved surface for cooperating with an inclined cam surface 30 on the upper edge of lever 24 to wedge plate 28 in its locking position against housing 16. When lever 25 is rotated clockwise, lever 24 is released to be drawn in a similar direction away from housing 16.

Pivoted at 32 to the plate 14 is a horizontal lever 33 having a handle 34 at one end and a depending scribe element 35 secured adjacent its other end by a set screw 36. A tension spring 37 resists rotation of lever 33 in a clockwise direction.

Projecting laterally from plate 14 is an arm 38 mounting a button 39 which controls an electric vibrator 40 in circuit with battery 41 or any other suitable source of electrical energy. Vibrator 40 carries a hammer 42 in a position to strike master coil mounting 10 so as to jar the coil and relieve frictional binding therein. Button switch 39 is operated by hand piece 43 pivoted to lever 33 adjacent handle 34.

The operation of the device is as follows:

Master coil 11 and its mounting are secured to plate 4 in such a position that distortion of the coil to bring indicator 8 opposite the index point marked "zero" (Figure 3) causes the coil to exert a desired force, in the present instance, the force desired to be applied to the choke valve to resist opening thereof at the prevailing temperature. The temperature factor is obviously unimportant as both coils are under identical temperature conditions during the calibration. The coil and housing to be calibrated are then manually applied to plate 14 and rotated so as to bring hook 19 into engagement with lip 20 and rotate shaft 3 a sufficient distance to again bring indicating pointer 8 adjacent the index point "zero" on plate 4. While the housing is held in position with one hand the operator grips handle 34 and hand piece 43 with the other, closing the button switch circuit by means of projection 44 on the hand piece which, in turn, causes vibration of hammer 42 so as to agitate or jar the master coil to relieve friction therein. After such agitation, the unknown coil is readjusted and when pointer 8 is finally opposite index point "zero", housing 16 is locked in position by means of clamping levers 24 and 25. Lever 33 is then pulled clockwise by the operator which causes scribe element 35 to form a notch, as at 45, in the edge of housing 16.

In assembling the thermostat housing with the carburetor or other mounting, notch 45 is placed adjacent a mark aligned vertically with pintle 18, as in the present case, or otherwise having the same relation with the choke shaft as scribe element 35 has with shaft 3 in the fixture. This greatly facilitates assembling the thermostat so as to properly tension the choke valve.

If desired, the master coil may be jarred otherwise than by the electrical agitator 42 for relieving frictional binding therein. Also, the housing of the unknown thermostat may be marked otherwise than by notching. In many instances, it will be desirable to omit the locking levers 24 and 25, in which case, the thermostat being calibrated will be held in position by the operator during the balancing and marking operations. Obviously, the principles of the invention may be utilized for calibrating springs in general, although particular advantage in connection with carburetor thermostatic choke springs as described.

These and other modifications, as will occur to those skilled in the art, may be made without departing from the spirit of the invention, and the exclusive use of all such modifications as come within the scope of the appended claims is contemplated.

I claim:

1. In a device of the class described, a support, an indicator pivotally carried thereby, a calibrated spring resisting movement of said indicator, means for applying to said support a part having an unknown spring to be calibrated, connecting means for applying the force of said unknown spring to said indicator against said calibrated spring when the unknown spring is distorted, and manual means guided by said support for marking said part as determined by said indicator.

2. Structure as specified in claim 1 further including means for agitating said calibrated spring to relieve frictional binding therein, said marking means including a lever having a hand piece for controlling said agitating means.

3. Structure as specified in claim 1 further including an electric vibrator for striking the device adjacent said calibrated spring, said marking means comprising a lever having a pivoted hand piece controlling said vibrator.

4. In a device of the class described, a support, a rotating shaft carried thereby, an indicator on said shaft, a calibrated spring having a mounting carried by said support, said spring resisting rotation of said shaft in one direction, means for applying a second spring and mounting therefor to said support in a manner to balance said second spring against said first spring, a scribe movably carried adjacent said means for marking said second mounting as determined by said indicator, and means associated with said marking means for striking said first mentioned mounting to relieve frictional binding therein.

5. In a device of the class described, a support, a member carrying an indicator pivoted on said support, means for applying a known resistance to said pivoted member, means for biasing a spring assembly of unknown resistance against said known resistance, and mechanism for clamping said spring assembly of unknown resistance against said support to facilitate application of assembly indicia thereon, said mechanism comprising a pivoted lever having an abutment for engaging said spring assembly, and a second lever having a pivotal support spaced from the pivot of said first mentioned lever, said second lever being disposed to engage said first lever to move said abutment to clamp said spring assembly against the support.

6. Structure as specified in claim 5 in which said levers have cooperating surfaces whereby said second lever wedges said first lever in its locking position.

ERNST H. NIEMAN.